United States Patent [19]

Rogers et al.

[11] 3,902,026

[45] Aug. 26, 1975

[54] METHOD AND APPARATUS FOR IDENTIFYING WIRES

[75] Inventors: Sidney Rogers; Barry N. Rogers; Robert E. Petrere, all of Toledo, Ohio

[73] Assignee: Electronic Control Systems, Inc., Toledo, Ohio

[22] Filed: Jan. 18, 1974

[21] Appl. No.: 434,390

[52] U.S. Cl. .......... 179/175.3 A; 324/66

[51] Int. Cl.² .......... H04M 3/22

[58] Field of Search ... 179/175.3 A, 175.25, 18 FH; 324/66, 51, 54, 73, 133

[56] References Cited

UNITED STATES PATENTS

| | | | |
|---|---|---|---|
| 3,476,888 | 11/1969 | Rollins et al. | 179/175.3 A |
| 3,699,438 | 10/1972 | Webb | 324/66 |
| 3,772,685 | 11/1973 | Masi | 324/66 |

*Primary Examiner*—Thomas A. Robinson
*Attorney, Agent, or Firm*—Oliver E. Todd, Jr.

[57] ABSTRACT

Improved method and apparatus for identifying individual wires of a plurality of wires extending between first and second spaced locations. A plurality of the wires at the first location are connected to individual addressable locations in a matrix. At the second location, signals indicative of individual wire identifications are sequentially applied to the wires with a portable coder and the wires are labeled with their assigned identifications. For each wire to which a signal is applied and having a connection to the matrix, manifestations of the assigned wire identification and of the matrix address for such wire are stored in a memory. The memory is then scanned for identifying the wires at the first location and the wires are labeled.

17 Claims, 5 Drawing Figures

METHOD AND APPARATUS FOR IDENTIFYING WIRES

BACKGROUND OF THE INVENTION

This invention relates to sorting wires or conductors and more particularly to an improved method and apparatus for identifying individual wires of a plurality of wires extending between two spaced locations.

There are many instances where it is necessary to identify individual ones of a plurality of wires extending between spaced locations. A telephone cable used to connect subscribers from remote locations to a central office, for example, may be made up of several hundred pairs of insulated conductors all contained within a single protective sheath. Each conductor terminates at a particular terminal at the central office and is connected to some headset of a particular subscriber at some remote field location. Each conductor at the remote end of the cable in the field location must be identified in terms of its corresponding terminal connection at the central office. Cables, ducts or trays are also used for carrying large numbers of wires between various locations in ships, airplanes and factories, for example, for use in power distribution, communications and controlling various processes. In each case, it is necessary to have a method for identifying the individual wires prior to making electrical connections to such wires. When only a few wires are involved, the wires are color coded for indentification. However, color coding is not successful for identifying large numbers of wires.

One method commonly used for identifying individual conductors, and particularly used for identifying conductors in a telephone cable, utilizes two workmen stationed, respectively, at the central office or near end of the cable and at the remote end of the cable. The man in the central office sequentially applies an audible signal to each of the conductors. He communicates the assigned identity of each energized conductor to a man at the remote end of the cable at the time the signal is applied. The man at the remote end has an electrical probe connected to an audio detector. when he is informed as to the identity of an energized conductor, he manually scans the conductors of the cable to find the energized one. When he locates an energized conductor, he puts an identification tag on it and notifies the man at the near end, who then applies the audible signal to another unidentified conductor. The procedure is continued until all of the conductors have been identified. However, this procedure takes a considerable amount of time when a large number of conductors are involved. This is due in part to the need for maintaining a continuous signal on a single conductor until such conductor is identified and to the time required for manually probing a large number of conductors to locate the single energized conductor.

Another method sometimes used for identifying individual wires involves the use of different valued resistances. Different value resistors are connected between the ends of perhaps ten wires at one end of a cable and a common ground. An ohmmeter is used for probing remote ends of the wires. If a wire is found to have a resistance to ground, the resistance value is measured for identifying the wire according to the resistance attached to its opposite end. However, only a limited number of wires may be identified in a given period of time by the use of this method.

The difficulty in identifying individual wires in a plurality of wires greatly increases as the number of wires to be identified increases. In a large factory or a utility such as a nuclear power plant, a duct may carry wires and cables totaling as high as 100,000 or more individual conductors. Several men may work as much as six months to one year simply in the task of identifying the individual wires within the duct. To date, there has been no acceptable method or apparatus for appreciably reducing the time required for identifying individual ones of large quantities of conductors.

SUMMARY OF THE INVENTION

According to the present invention, an improved method and apparatus are provided for identifying individual wires or conductors in a large plurality of wires extending between two spaced locations. At the first location, either a large number or all of the wires are connected to terminals on a console. The terminals are attached to individual addressable locations in an input matrix which is connected through an address decoding circuit to a random access memory (RAM).

A portable hand held coder is used at the second location for assigning predetermined identifications to each of the wires. The coder includes a keyboard for entering a desired identification number for a wire attached to a terminal on the coder. The identification and a parity signal for detecting the presence of error are then sent over the wire to the console and receipt of such signal by the console is acknowledged back over the wire. After an identification has been sent over the wire and an acknowledgement received and indicated on the coder, the operator labels the wire and proceeds with selecting and identifying another one of the plurality of wires. The coder includes lamps for indicating an unsuccessful transmission, an open circuit in the connected wire or a short circuit in the connected wire.

When the console receives an identification signal over one of the wires connected to the matrix, the identification for such wire and the address location of the wire in the matrix are stored in the memory. The console also checks the accuracy of the received identification by means of a parity check and checks for the presence of crosstalk, as indicated by the simultaneous presence of an identification signal on two or more wires. If either parity error or corsstalk are detected, the address is not stored in the memory and an error signal is sent back on the wire to the coder at the second location. After the wires are identified and labeled at the second location, they are identified and labeled at the first location. The console may be adapted to automatically scan and identify the wires in the matrix or to identify a particular wire in the matrix. In the automatic mode, the scanner stops on the first wire for which an address and identification are stored within the memory. An indicator light next to the terminal connected to this wire is then illuminated and the identification is displayed. The wire may then be removed from the matrix and labeled and the scanner will continue on to the next wire which has been previously identified at the second location. As an alternative, a keyboard located on the console may be used for manually entering the matrix address location of a predetermined wire. The called for address is then located within the memory, a lamp next to the wire is illuminated and the wire identification number is displayed.

Accordingly, it is a preferred object of the invention to provide an improved method and improved apparatus for identifying individual wires of a plurality of wires extending between first and second spaced locations.

Another object of the invention is to provide a method and apparatus for identifying individual wires of a plurality of wires extending between first and second locations which does not require the maintenance of a signal on a wire until it is identified by manually probing the wires.

Still another object of the invention is to provide an improved method and apparatus for identifying individual wires of a plurality of wires extending between first and second spaced locations with a minimum chance for the occurrence of error in identifying such wires.

Other objects and advantages of the invention will become apparent from the following detailed description, with reference being made to the accompanying drawings.

DESCRIPTION OF THE PREFERRED EMBODIMENTS

Figure 1:
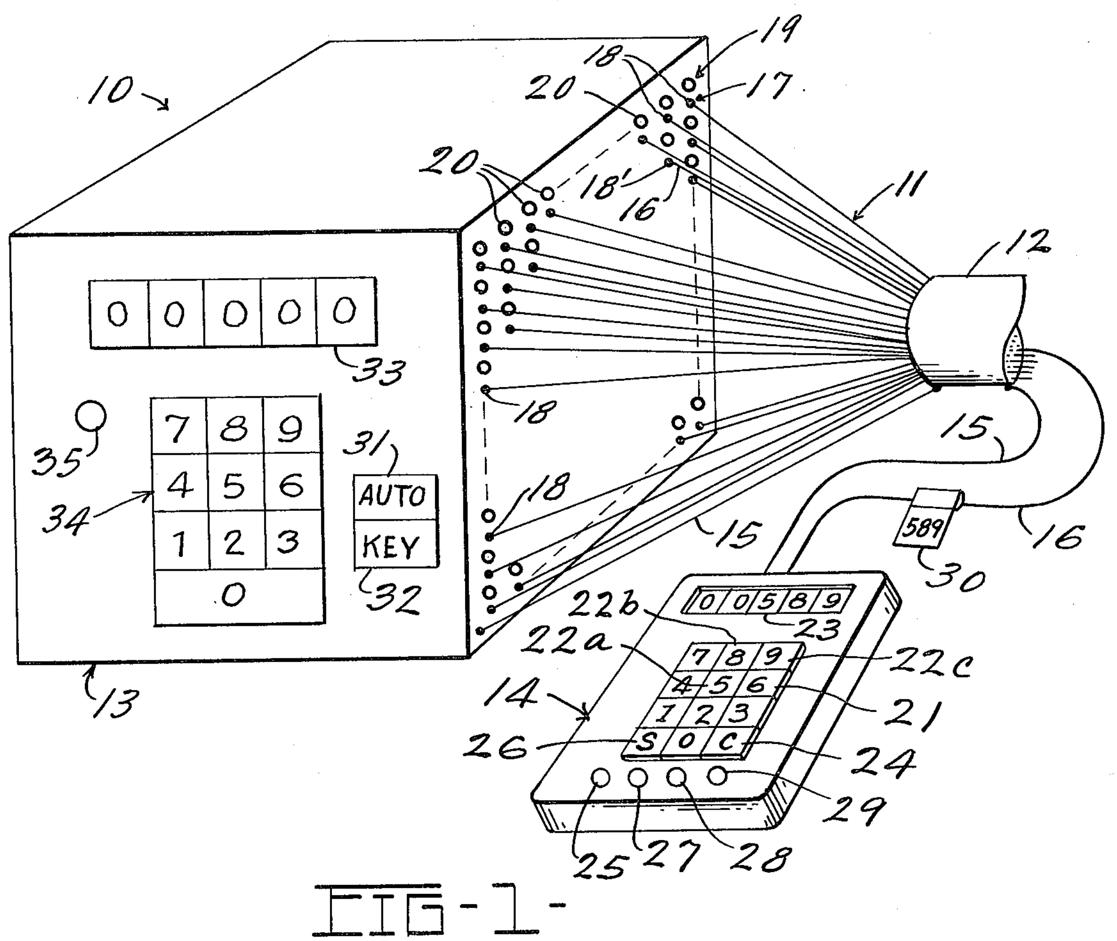
FIG. 1 is a pictorial view showing a multi-conductor cable connected to apparatus embodying the principles of the present invention for identifying the individual wires within the cable.

Turning now to the drawings and particularly to FIG. 1, apparatus 10 is shown constructed in accordance with the present invention for identifying individual wires of a plurality of wires 11 which extend between first and second spaced locations. The wires 11 may, for example, be grouped together into a cable 12 or they may be loosely held together within a trough or duct (not shown). The plurality of wires or conductors 11 may extend between spaced locations within, for example, an aircraft, a ship, a communication system or a factory. In some instances, at least some of the plurality of wires 11 may be as much as 5,000 or more feet long while others of the wires may be considerably shorter. The second or remote location may be at the end of a wire being identified or at some intermediate point.

Ends of the wires 11 at the first location are attached to a console 13 while the wires at the second location are selectively connected to a portable coder 14. The coder 14 is connected through a common electrical ground to the console 13, as by a ground conductor 15 which runs through the cable 12. A wire 16, to be identified from the plurality of wires 11, is connected to the coder 14 by any suitable method, such as by inserting an end of the wire 16 into a wire receiving terminal in the coder 14 or by means of a probe (not shown) which may be of a type capable of piercing insulation on the wire 16.

At least some of the plurality of wires 11 to be identified are connected to an input matrix 17 on the console 13. The input matrix 17 may be as large or as small as desired. For the following description of the apparatus 10 for identifying wires, the matrix 17 will be considered to have 50 columns and 20 rows for receiving up to 1000 of the wires 11. when more than 1,000 wires are involved, the wires are identified in batches of 1,000 wires at a time. However, it will be appreciated that the matrix 17 may be made as large or as small as desired to meet the needs for sorting larger or smaller quantities of wires. The input matrix 17 includes a suitable terminal 18 at each matrix junction for receiving a different one of the wires 11. Each terminal 18 is located at a distinct addressable location within the matrix 17. An output matrix 19 including a plurality of incandescent lamps 20 is superimposed upon the input matrix 17 with a different lamp 20 located adjacent each of the terminals 18. The lamps 20 may be selectively energized for identifying individual ones of the wires 11 connected to the different terminals 18.

The coder 14 is used for assigning a preselected identity to the selected wire 16 from the plurality of wires 11. A workman connects the wire 16 to be identified to the coder 14 at the second location, which is remotely spaced from the first location. The coder 14 includes a keyboard 21 for entering an identification number which is assigned to the wire 16. For the following discussion, it will be assumed that the identification number 589 has been arbitrarily assigned to the wire 16. This number is entered into the coder 14 by sequentially pushing the five key 22*a*, the eight key 22*b* and the nine key 22*c*. The number 589 is then displayed on a digital readout 23 and the workman visually verifies that the correct keys in the keyboard 21 have been punched. If an incorrect key has been punched, a "clear" key 24 is provided for clearing from the coder 14 the previously entered number which is displayed on the indicators 23. At the same time a number is entered through the keyboard 21, an "unsuccessful transmission" indicator light 25 becomes illuminated.

After the number assigned to the wire 16 is entered into the coder 14 and visually verified, a "send" key 26 on the keyboard 21 is pushed. The send key 26 causes the assigned number 589 to be transmitted over the wire 16 to the console 13. If the transmission is successful, the console 13 applies an acknowledgement signal on the wire 16, whereupon the unsuccessful transmission light 25 is extinguished and the number 589 is cleared from the coder 14. If, however, no acknowledgement signal is received, the unsuccessful transmission light 25 will remain on and the operator may again attempt to transmit the assigned identification number over the wire 16 by again actuating the send key 26.

If the transmission is unsuccessful due to the fact that the wire 16 is shorted to ground, a "shorted transmission line" indicator light 27 is illuminated on the coder 14. In this event, the workman labels the wire 16 as being defective or shorted and proceeds to select a different one of the plurality of wires 11 for identification. On the other hand, if a transmission is unsuccessful due to an open circuit in the line 16 or due to the fact that the line 16 is not one of the wires connected to the console 13, then an "open transmission line" indicator light 28 is illuminated on the coder 14 and again the workman may select a different one of the plurality of wires 11 for identification. For portability, the coder 14 is battery operated. The coder 14 is provided with an indicator light 29 for indicating when the batteries are too low for proper operation of the apparatus 10. The low battery light 29 may be flashed rather than operated continuously to minimize battery drain and to draw attention to the low battery condition.

After the wire 16 has been identified by the successful transmission of an assigned number over the wire 16 to the console 13, the workman applies a label 30 to the wire 16 which bears the identification number assigned to such wire and the wire 16 is removed from the coder 14. The workman then selects a different one of the plurality of wires 11 for identification and connects it to the coder 14. Although only a single clear button 24 is shown in the coder 14, it may be desirable to provide two separate clear buttons which are connected in series to prevent accidental clearing of an identification number entered into the coder 14.

The console 13 is provided with an internal memory which is connected through logic circuitry to the input matrix 17 and to the output matrix 19. When an identification number is received over the wire 16 of the plurality of wires 11 connected to the input matrix 17, the address of a terminal 18' connected to the wire 16 is stored in the memory along with the number or identification assigned to the wire 16. After the coder 14 is used for assigning identification numbers to the wires 11 at the second location, the console 13 is used for identifying the wires 11 at the first location. The console 13 may be operated in either automatic or keyboard modes which are selected by means of switches 31 and 32, respectively. When the automatic mode of operation is selected by means of the switch 31, the memory is automatically scanned in the sequence of the terminals in the input matrix 17, starting with the uppermost row of terminals 18 and working downwardly. Upon reaching an address for the first terminal in the matrix 17 for which an identified wire is connected, the scanning will stop and the lamp 20 in the output matrix 19 next to such terminal 18 is illuminated. At the same time, the number which has been assigned to the wire connected to such terminal 18 is displayed on a digital readout 33. The workman then removes such wire from the terminal 18 and applies a label bearing the identification number to such wire. The console 13 may be connected to a printer 33, which automatically prints the identification number displayed on the digital readout 33 when the wire bearing such identification is removed from the input matrix 17. The printer 33, may be actuated by the power supplied to the energized lamp 20 next to the terminal 18 connected to such wire.

In a second mode for operating the console 13, the keyboard selecting switch 32 is actuated. After actuating the keyboard switch 32, a keyboard 34 may be used for entering the address of one of the input matrix terminals 18 into the console 13. When a terminal address is entered into the console 13, the lamp 20 in the output matrix 19 adjacent such terminal 18 is illuminated. Logic circuitry then checks the contents of the internal memory for the identification number associated with such address and displays the identification number on the digital readouts 33. A parity check is made on the wire identification read from the memory to detect any error in the number. If an error is detected, a lamp 35 is illuminated.

In a modified type of operation, the keyboard 34 may be used for entering an identification number rather than a terminal address in the input matrix 17. Upon entering an identification number, the internal memory is searched for such number and the address of the wire bearing such identification number is read from the memory. The lamp 20 in the output matrix 19 is then illuminated to indicate the location of the wire bearing such desired identification. At the same time, the identification number entered through the keyboard 34 is shown on the digital readout 33. However, this embodiment is not as convenient as the embodiment wherein the address is entered through the keyboard 34 because the located wire may be in the center of the input matrix 17 where it is difficult to remove for labeling.

Figure 2:
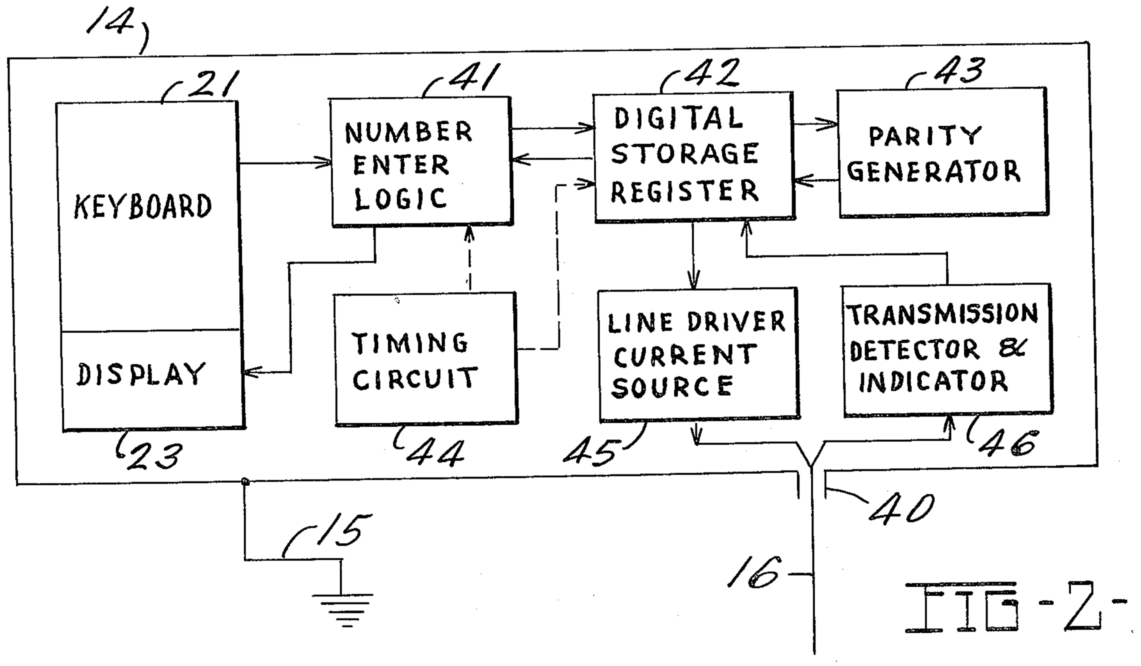
FIG. 2 is a block diagram of the portable coder for assigning a predetermined identification to a preselected wire.

Turning now to FIG. 2, a schematic block diagram is shown for the coder 14. The preselected wire 16 from the plurality of wires 11 is connected to the coder 14 by means of a suitable terminal 40. The terminal 40 may be spring loaded to facilitate connecting and disconnecting wires of different sizes. After the wire 16 is connected to the terminal 40, an identification number assigned to the wire 16 is entered through the keyboard 21. Number enter logic 41 decodes the entered identification number and stores such number within a register 42 which may, for example, comprise a 4-bit shift register which stores the number in a binary coded decimal (BCD) format. At the same time, the number stored within the register 42 appears on the digital display 23. To reduce the chance of error occurring in the identification assigned to the wire 16, a parity generator 43 is connected to store one or more parity bits within the storage register 42 with the wire identification number. The parity generator 43 may be used for generating any conventional type of parity bits for use in an accuracy check. For example, the parity generator may be used for generating a single bit which indicates if there is an odd or even number of bits in the total identification number stored within the register 42. Or, two parity bits may be used, for example, to indicate whether or not specific digits such as the third and fifth digits of the identification number are of even or odd parity. The parity bits are stored within the digital storage register 42 and are transmitted over the wire 16 after the identification number is transmitted.

Sequencing and control of the coder 14 is accomplished by means of a clock or timing circuit 44. When the send button 26 on the keyboard 21 is pushed, the timing circuit 44 clocks the identification number stored in the register 42 to a line driver current source 45 for transmitting a signal over the wire 16 indicative of the predetermined identification for such wire 16. The parity bits stored in the register 42 are transmitted immediately after the identification number. The identification number and parity bits may be transmitted in any conventional manner. For example, the number and parity bits may be sent over the wire 16 as a pulse train. Or, preferably, the number and parity bits are sent as a pulse train superimposed upon a current pulse. This will minimize the chance of noise causing an error in the signal received at the console 13.

If a successful transmission is made, the console 13 applies an acknowledgement signal on the wire 16 which is received by a transmission detector and indicator 46. The transmission detector and indicator includes the unsuccessful transmission lamp 25, the shorted transmission line lamp 27, the open transmission line lamp 28 and the low battery lamp 29. The unsuccessful transmission lamp 25 is turned on as long as an identification number is stored within the digital storage register 42. At the time an acknowledgement signal is received on the wire 16, the transmission detector and indicator 46 clears the digital storage register 42 and the unsuccessful transmission lamp 25 is extinguished. If a successful transmission acknowledgement is not received over the wire 16, the preselected identification number will remain in the digital storage register 42 and the unsuccessful transmission light 25 will continue to be energized. In the event that the wire 16 is either short circuited or open circuited to the extent of having a high resistance as when there is no connection to the console 13, either the shorted transmission line light 27 or the open transmission line light 28 will become illuminated. At this time, the storage register 42 may be manually cleared by means of the clear button 24 on the keyboard 21 and the wire 16 is removed from the terminal 40 and labeled as being defective.

Figure 3:
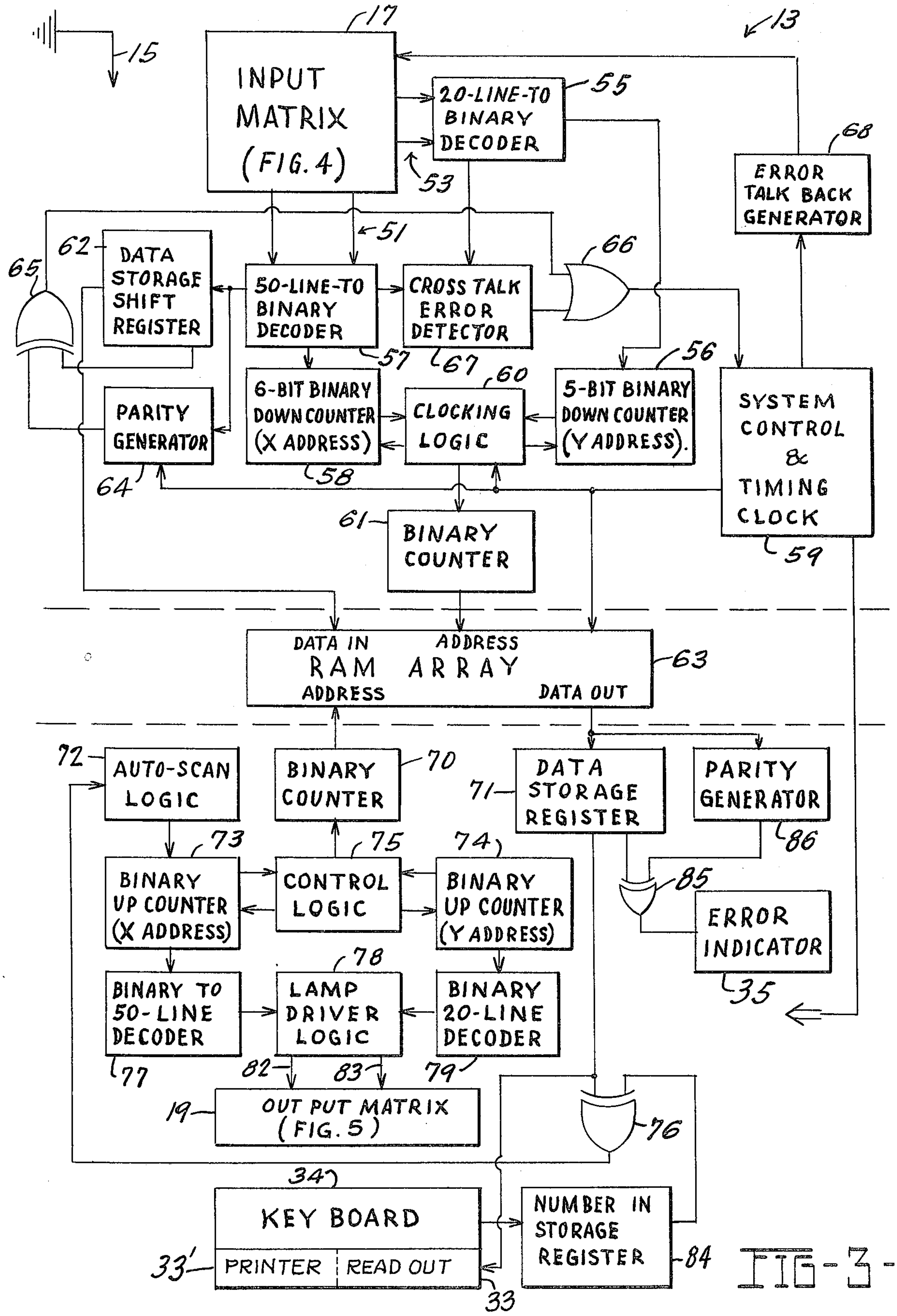
FIG. 3 is a schematic block diagram of a console for identifying wires to which an identification has been assigned.
Figure 4:
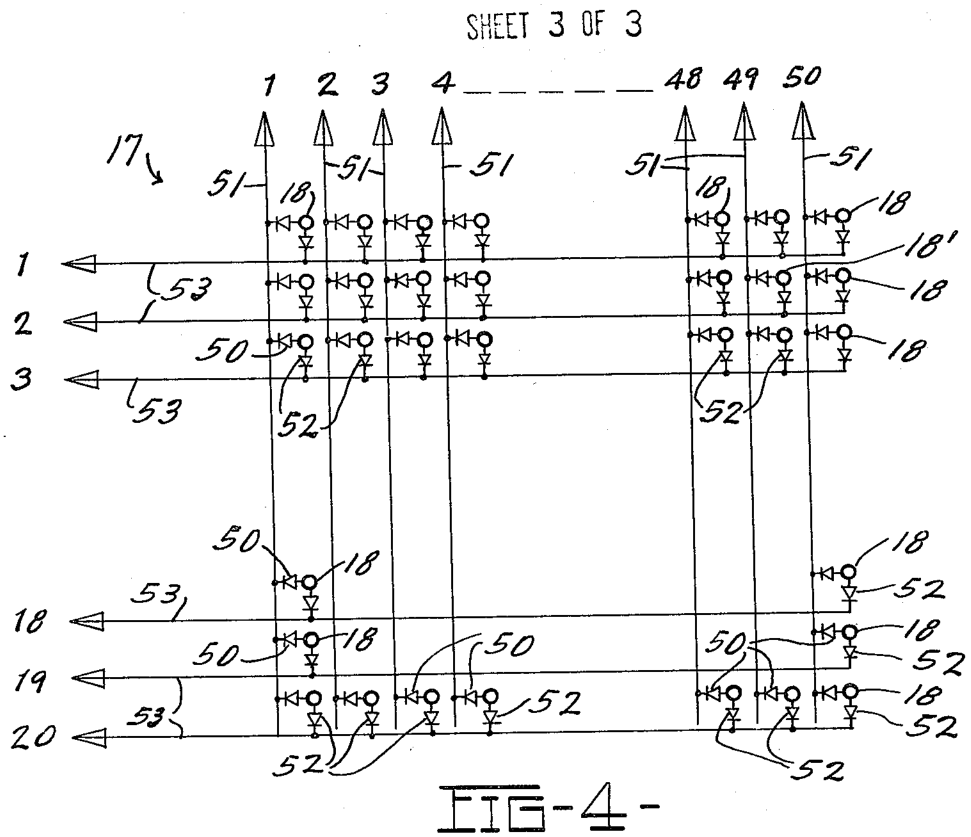
FIG. 4 is a circuit diagram of the input matrix in the console of FIG. 3.

Turning now to FIG. 3, a schematic block diagram is shown for the console 13. The console 13 includes a connection through the common ground conductor 15 to the coder 14. The common ground conductor 15 completes the circuit through the selected wire 16 of the plurality of wires 11 between the coder 14 and the console 13. As previously stated, at least some of the plurality of wires 11 are connected to an input matrix 17. A typical input matrix 17 is shown in detail in FIG. 4. The input matrix 17 shown in FIG. 4 has arbitrarily been established as having 20 rows by 50 columns to provide for connecting up to 1,000 wires of the plurality of wires 11. If the cable 12 should have more than 1,000 wires, only 1,000 of the wires are connected to be identified at a time. A terminal 18 is located at the function of each matrix row and column. Isolation diodes 50 connect each of the terminals 18 to an associated column bus 51 and diodes 52 connect each of the terminals 18 to an associated row bus 53. Thus, the address for each indvidual terminal 18 is determined by the column bus 51 and row bus 53 energized when a signal is received over a wire 11 connected to a terminal 18. Although diodes 50 and 52 are shown connecting the terminals 18 to the buses 51 and 53, transistors may be used.

Returning again to FIG. 3, the 20 row buses 53 from the input matrix 17 are connected to a 20 line-to-binary decoder 55. The binary output from the decoder 55, which is a row or Y address, is stored in a 5-bit binary down counter 56. The 50 column buses 51 from the input matrix 17 are connected to a 50 line-to-binary decoder 57. The output from the decoder 57, which is a column or X address, is stored within a 6-bit binary down counter 58. Thus, when a signal is received over one wire 16 of the plurality of wires 11, the row and column addresses for the terminal 18' connected to such wire 16 are stored within the counters 56 and 58, respectively.

When addresses are stored within the counters 56 and 58, a system control and timing clock 59 energizes clocking logic 60 for sequentially clocking the addresses from the counters 56 and 58 into a binary counter 61. When identification data is received from the coder 14 over a wire connected to the input matrix 17, the data is passed from the decoder 57 and into a storage register 62 at the same time the matrix address for such wire is stored within the counters 56 and 58. The decoders 55 and 57 generate binary matrix row and column addresses based upon which one of the row buses 53 and which one of the column buses 51 identification data is received from the input matrix 17. The binary matrix row and column addresses are not affected by the actual nature of the received identification data, even though such data is applied to the decoders 55 and 57. The wire identification data from the shift register 62 and the matrix address from the counter 61 are stored in a random access memory (RAM) 63. Transfer of such data address information into the memory 63 is controlled in a conventional manner by the system control 59.

Prior to shifting data and address information into the memory 63, a parity check is made for the accuracy of the data stored in the register 62. This check is made by means of a parity generator 64 and an exclusive OR gate 65. When data is shifted from the input matrix 17 through the decoder 57 into the storage register 62, it is also supplied to the parity generator 64. The system control 59 causes the parity generator 64 to generate parity bits from the wire identification data in a manner similar to that in which the original parity bits were generated in the coder 14 by the parity generator 43. The output of the parity generator 64 is supplied to one input of the exclusive OR gate 65. When a parity bit is stored in the data storage register 62, an output from the register 62 applies such parity bit to a second input of the exclusive OR gate 65 where it is compared with the output of the parity generator 64. The output of the exclusive OR gate 65 is connected through an OR gate 66 to the system control 59. The OR gate 66 has a second input connected from a crosstalk error detector 67. The crosstalk error detector 67, which has inputs connected to the decoders 55 and 57, generates an error signal in the event of a signal appearing simultaneously on two or more terminals 18 in the input matrix 17. Signals may appear simultaneously on two different terminals 18 of the input matrix 17 due to crosstalk coupling where the wires 11 are extremely long or due to a short between two of the wires 11.

Upon either the presence of crosstalk as indicated at the output of the detector 67 or the absence of a parity check as indicated at the output of the exclusive OR gate 65, the OR gate 66 applies a signal to the system control 59. The system control 59 will then cause an error-talkback generator 68 to transmit an error signal over the wire 16 to the coder 14. In the absence of a signal from the gate 66, the system control 59 will cause the generator 68 to send an acknowledgement signal over the wire 16 when identification data and the address for such wire are stored within the memory 63. As previously indicated, the acknowledgement signal will clear the identification number for the wire 16 from the coder 14 and will extinguish the unsuccessful transmission light 25.

The individual wires of the plurality of wires 11 connected to the input matrix 17 are identified and labeled from the data and address information stored within the memory 63. A readout address is supplied to the memory 63 from a binary counter 70. When data is present in the memory 63 at the address stored within the counter 70, such data is shifted into a data storage register 71 under the control of the system control and timing clock 59. The data stored within the register 71 corresponds to the predetermined identification assigned to the wire 11 attached to the terminal 18 at the address location in the matrix 17 corresponding to the memory address stored within the counter 70. Any wire identification number stored in the register 71 is applied to the readout 33 where it is displayed in a digital format. The address of the wire 11 for which identification data is read from the memory 63 is determined either by circuitry which automatically scans the memory 63 in a sequence which moves across the output matrix 19 or by an address supplied through the keyboard 34.

In the automatic mode of operation, auto scan logic 72 steps a binary up counter 73 through the fifty column or X addresses of the output matrix 19 and a binary up counter 74 through the 20 row or Y addresses of the output matrix 19. The wire address counter 74 is counted up once for each time the X address counter 73 is cycled through a complete count of 50. Thus, the output matrix 19 is cycled by sweeping across the top row of the matrix and sequentially sweeping through the succeeding rows of the matrix. The addresses stored in the counters 73 and 74 are applied through control logic 75 to the binary counter 70 for supplying a readout address to the memory 63. When the counter 70 supplies an address to the memory 63, any wire identification data stored at such address is shifted into the data storage register 71. When data is shifted into the register 71, a signal is applied from the output of the register 71 through an exclusive OR gate 76 to the auto scan logic 72 to terminate scanning. At this time, the data stored in the register 71 is displayed in the readout 33.

The X address stored in the binary counter 73 is applied through a binary-to-50 line decoder 77 to lamp driver logic 78. Similarly, the Y address stored in the binary counter 74 is applied through a binary-to-20 line decoder 79 to the lamp driver logic 78. The lamp driver logic 78 addresses and energizes the lamp 20 in the output matrix 19 adjacent the terminal 18 connected to a wire 11 for which identification data is stored in the register 71 and displayed on the readout 33.

Figure 5:
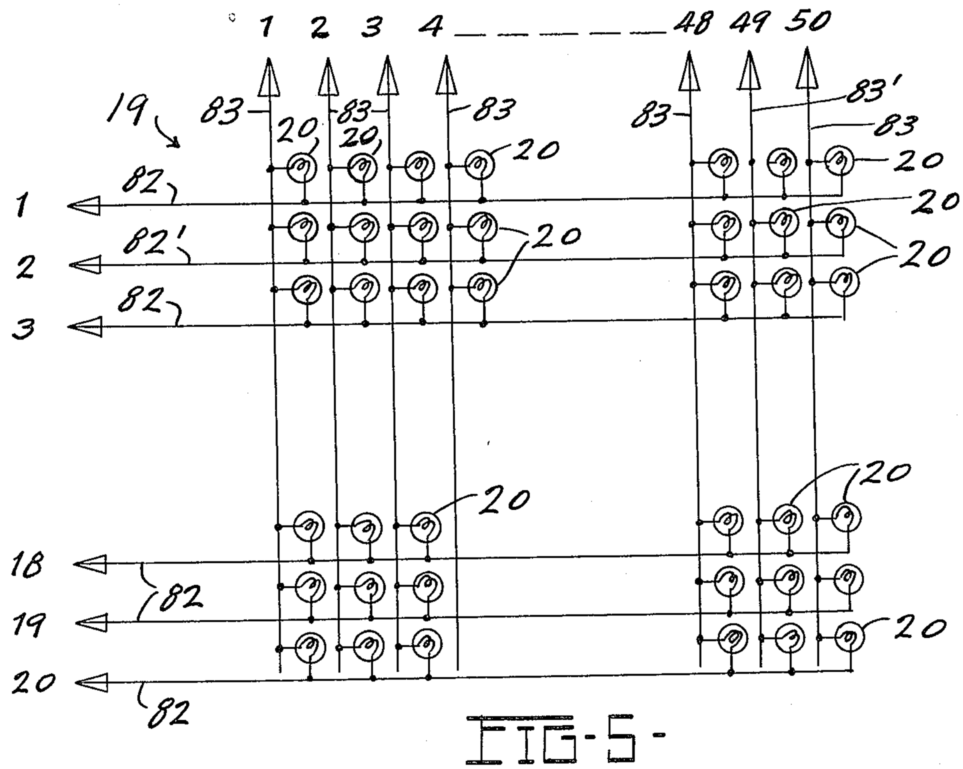
FIG. 5 is a circuit diagram of the output matrix in the console of FIG. 3.

Turning for a moment to FIG. 5, the output matrix 19 is shown in detail. The matrix 19 includes 20 row busses 82 and 50 column busses 83. Intersections of the row and column busses 82 and 83 form distinct address locations corresponding to the address locations of the terminals 18 in the input matrix 17. A lamp 20 is connected across each such row-column intersection and each lamp 20 is positioned adjacent a corresponding one of the terminals 18 for identifying such terminal. Thus, if a signal is applied on the second buss 82' and a signal is applied on the 49 column buss 83', a lamp 20' in the output matrix 19 adjacent the terminal 18' in the input matrix 17 will become illuminated for indicating that the identification number displayed in the readout 33 has been assigned to the wire connected to the terminal 18'.

Returning again to FIG. 3, in the automatic mode of operation readout, addresses are sequentially applied to the memory 63 until an address location is reached wherein identification data is stored. When such an address is reached, the data is read into the register 71 and the scanning is caused to cease by an output from the gate 76. At this time, the lamp 20 in the output matrix 19 located at such address is illuminated and the identification information is displayed on the readouts 33. A workman will then remove the wire 11 connected to the terminal 18 adjacent the illuminated lamp 20. After the wire is removed from the input matrix 17, a label bearing the assigned identification is applied to the wire. Such label may be applied either manually or by means of an automatic printer (not shown). Automatic label printers and applicators suitable for use with the wire identification apparatus 10 are well known. A printer of the type used with a value computing scale, for example, may be adapted for use with the apparatus 10. Such printers print a label from digital information received from the scale and may also apply the label to a package.

The printer may be manually operated or it may be automatically actuated when the wire 11 is removed from a terminal 18 adjacent an energized lamp 20. An interlock may also be provided to prevent actuation of the printer if a wire is removed from a terminal for which the adjacent lamp is not illuminated, thereby reducing the possibility of applying an incorrect identification to a wire. This may be accomplished by using the power which energizes the lamp to actuate the printer.

In addition to the automatic mode of operation, the console 13 is provided with a manual mode for determining the identification of a particular wire 11 connected to the input matrix 17. The address of the wire 11 for which an identification is desired may be entered through the keyboard 34. An address entered through the keyboard 34 is stored within a storage register 84. Under the control of the system control and timing clock 59, the storage register 84 applies such manually entered address through the exclusive OR gate 76 to the auto scan logic 72. The auto scan logic 72 then advances the contents of the counters 73 and 74 to the desired address. When the desired address is stored within the counters 73 and 74, the memory 63 is read for any identification data on the wire 11 connected to the input matrix 17 at such address. If identification data is present in the memory 63, it is read into the register 71 and displayed on the readout 33. At the same time, the appropriate lamp 20 in the output matrix 19 is illuminated.

It is generally desirable to operate the console 13 in an automatic mode when identifying the wires 11 connected to the input matrix 17. This is due to the fact that an extremely large number of wires 11 may be connected to the terminals 18 in a relatively small area in the input matrix 17. If the identification data shown in the readout 33 is for a wire located towards the center of the matrix 17, it may be extremely difficult to remove and label the identified wire from the matrix 17 without disturbing the other wires. However, it is generally convenient to identify the wires sequentially across the top of the matrix and, as such wires are identified, removed from the matrix and labeled, to work down through the matrix 17. Thus, the automatic mode of operation provides for an efficient fast method of identifying the plurality of wires 11 connected to the input matrix 17.

To increase the reliability of the information read from the memory 63 for identifying the wires 11 connected to the input matrix, a parity check is made on such data. The parity bits read out of the memory 63 into the storage register 71 are applied to an exclusive OR gate 85. Data read from the memory 63 is also applied to a parity generator 86 which generates one or more parity bits in the same manner in which they were originally generated by the generator 43 in the coder 14. If the parity bits generated in the generator 86 differ from those read from the memory 63, the exclusive OR gate 85 will energize an error indicator lamp 87. The output from the exclusive OR gate 85 may also be used for blanking the readout 33 in the event of an error, thereby preventing the workman from ignoring the error indicator lamp 87.

The various components of the coder 14 of FIG. 2 and the console 13 of FIG. 3 have been shown in block form. It will be appreciated to those skilled in the art that such components are generally available or readily constructed from available integrated circuits. It will also be readily appreciated that the above-described preferred embodiment of a method and apparatus for identifying individual wires of a plurality of wires may be modified without departing from the spirit and the scope of the claimed invention.

What I claim is:

1. A method for identifying individual wires of a plurality of wires extending between first and second locations comprising the steps of: connecting a plurality of said wires at said first location to individual addressable locations in a matrix; sequentially applying to at least some wires at said second location different signals indicative of a predetermined identification for each such wire; for each wire to which a signal is applied at said second location and having a connection to said matrix, storing in a memory connected to said matrix manifestations of the wire identification and of the matrix address of such wire; and identifying wires connected to said matrix at said first location from such stored manifestations.

2. A method for identifying individual wires of a plurality of wires, as set forth in claim 1, and including the step of labeling each wire at said second location to which a signal is applied with its predetermined identification.

3. A method for identifying individual wires of a plurality of wires, as set forth in claim 1, and further including the step of applying an acknowledgement signal to each wire connected to said matrix after manifestations of the matrix address and of the wire identification have been stored in said memory.

4. A method for identifying individual wires of a plurality of wires, as set forth in claim 3, and including the step of indicating at said second location when an identification signal is applied to a wire which is not connected to said matrix at said first location.

5. A method for identifying individual wires of a plurality of wires, as set forth in claim 3, and including the step of indicating at said second location when an identification signal is applied to a wire having an open circuit between said first and second locations.

6. A method for identifying individual wires of a plurality of wires, as set forth in claim 3, and including the step of indicating at said second location when an identification signal is applied to a wire which is short circuited to ground.

7. A method for identifying individual wires of a plurality of wires, as set forth in claim 1, and including the step of printing an identification label for each wire at said first location as each such wire is identified, and applying each printed identification label to such identified wire at said first location.

8. Apparatus for identifying individual wires of a plurality of wires extending between first and second locations comprising, in combination, a transmitter including means for generating a signal indicative of a predetermined identification for a wire and means for applying such signal to a wire to be so identified at said second location, a matrix having individual addressable locations, means for connecting a plurality of said wires at said first location to different ones of said addressable matrix locations, a memory, means connecting said memory to said matrix for storing in said memory manifestations of the matrix addresses of wires over which identification signals are received and manifestations of the received identification for each such wire, and means responsive to the address and identification manifestations stored in said memory for identifying wires at said first location connected to said matrix.

9. Apparatus for identifying individual wires of a plurality of wires, as set forth in claim 8, and including means at said first location for applying an acknowledgement signal on a wire connected to said matrix after manifestations of the matrix address and identification for such wire have been stored in said memory.

10. Apparatus for identifying individual wires of a plurality of wires, as set forth in claim 9, and including means at said second location responsive to such acknowledgement signal for indicating a successful transmission of a wire identification.

11. Apparatus for identifying individual wires of a plurality of wires, as set forth in claim 8, and including means at said second location for indicating when an identification signal is applied to a wire which is not connected to said matrix at said first location.

12. Apparatus for identifying individual wires of a plurality of wires, as set forth in claim 8, and including means at said second location for indicating when an identification signal is applied to a wire having an open circuit between said first and second locations.

13. Apparatus for identifying individual wires of a plurality of wires, as set forth in claim 8, and including means at said second location for indicating when an identification signal is applied to a wire which is short circuited to ground.

14. Apparatus for identifying individual wires of a plurality of wires, as set forth in claim 8, wherein said identifying means responsive to the stored manifestations includes means adjacent said matrix for identifying a single matrix location, and means for displaying the identification for a wire connected to said matrix at such location.

15. Apparatus for identifying individual wires of a plurality of wires, as set forth in claim 14, wherein said identifying means responsive to the stored manifestations further includes means for scanning said memory in a predetermined sequence, means for stopping said scanning means at the first manifestations of a wire identification located in said memory, means for applying such identification manifestations to said identification displaying means, and means for applying address manifestations for such wire to said matrix location identifying means for identifying the matrix location to which such wire is connected.

16. Apparatus for identifying individual wires of a plurality of wires, as set forth in claim 8, wherein said transmitter further includes means for generating at least one parity bit from said identification signal and means for applying such parity bit on such wire along with the identification signal, and wherein said means for connecting said matrix to said memory includes means responsive to such parity bit for detecting any error in the signal received on such wire.

17. Apparatus for identifying individual wires of a plurality of wires, as set forth in claim 16, wherein said means for connecting said matrix to said memory further includes means for storing such parity bit in said memory with the associated wire identification manifestations, and wherein said means for identifying wires at said first location includes means responsive to such stored parity bit for detecting any error in wire identification manifestations read from said memory.

* * * * *

UNITED STATES PATENT OFFICE

CERTIFICATE OF CORRECTION

PATENT NO. : 3,902,026

DATED : August 26, 1975

INVENTOR(S) : Sidney Rogers, Barry N. Rogers & Robert E. Petrere

It is certified that error appears in the above-identified patent and that said Letters Patent are hereby corrected as shown below:

In the heading of the patent, the Assignee information should be corrected to read "Electronic Systems, Inc.".

Column 1, line 29, "indentification" should be "identification";
line 48, "The" should be "This";
Column 2, line 47, "corsstalk" should be "crosstalk";

line 7, "when" should be "When";
Column 5, lines 47 and 51, "33," should be "33'";
Column 7, line 32, "20" should be "twenty" and "50" should be "fifty";
line 37, "function" should be "junction";
line 41, "indvidual" should be "individual";

Column 8, line 12, after "data" the word "and" should be inserted

Signed and Sealed this

*thirteenth* Day of *January 1976*

[SEAL]

*Attest:*

RUTH C. MASON
*Attesting Officer*

C. MARSHALL DANN
*Commissioner of Patents and Trademarks*